(12) United States Patent
Tiwari et al.

(10) Patent No.: US 9,595,069 B2
(45) Date of Patent: Mar. 14, 2017

(54) CONTEXTUAL CONNECTION RECOMMENDATION IN A SOCIAL NETWORK

(71) Applicant: LinkedIn Corporation, Mountain View, CA (US)

(72) Inventors: Mitul Tiwari, Mountain View, CA (US); Curtis Wang, Santa Clara, CA (US); Aastha Jain, Sunnyvale, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/985,964

(22) Filed: Dec. 31, 2015

(65) Prior Publication Data

US 2016/0224562 A1 Aug. 4, 2016

Related U.S. Application Data

(60) Provisional application No. 62/110,339, filed on Jan. 30, 2015.

(51) Int. Cl.
*G06F 7/00* (2006.01)
*G06F 17/30* (2006.01)
*G06Q 50/00* (2012.01)

(52) U.S. Cl.
CPC ....... *G06Q 50/01* (2013.01); *G06F 17/30867* (2013.01)

(58) Field of Classification Search
CPC ............... G06F 17/30; G06F 17/3053; G06F 17/30958; G06F 17/30867; G06F 17/3064; G06F 17/30864; G06F 17/3089; G06F 17/3097; G06Q 50/01

See application file for complete search history.

(56) References Cited

U.S. PATENT DOCUMENTS

| | | | |
|---|---|---|---|
| 2011/0314017 A1* | 12/2011 | Yariv | G06Q 30/02 707/737 |
| 2014/0074934 A1* | 3/2014 | van Hoff | G06F 17/3053 709/204 |
| 2014/0108153 A1* | 4/2014 | Matus | G06Q 30/0269 705/14.66 |
| 2014/0244389 A1* | 8/2014 | Konig | G06Q 30/0255 705/14.53 |
| 2016/0055541 A1* | 2/2016 | Calistri-Yeh | G06F 17/30867 705/14.66 |

* cited by examiner

*Primary Examiner* — Azam Cheema
(74) *Attorney, Agent, or Firm* — Schwegman Lundberg & Woessner, P.A.

(57) ABSTRACT

A system and method for contextual connection recommendation includes obtaining, with a processor from a database, contextual data and social graph data related to a pair of members of a social network who are not currently connected on the social network. A connection base score between the pair of members is generated based on the social graph data. A recommendation modifier is generated based on the contextual data. A connection recommendation modified score is determined by applying the recommendation modifier to the base score. A connection recommendation is provided to at least one of the pair of members based, at least in part, on the connection recommendation modified score.

18 Claims, 5 Drawing Sheets

400

202

| | 202A | 202B | 202C | 202D | 202E |
|---|---|---|---|---|---|
| 202A | N/A | N/A | 4.0 | 1.2 | 0.25 |
| 202B | N/A | N/A | N/A | 2.6 | 0.1 |
| 202C | 4.0 | N/A | N/A | N/A | 0.0 |
| 202D | 1.2 | 2.6 | N/A | N/A | 0.8 |
| 202E | 0.25 | 0.1 | 0.0 | 0.8 | N/A |

CONTEXTUAL CONNECTION RECOMMENDATION IN A SOCIAL NETWORK

CROSS-REFERENCE TO RELATED APPLICATIONS

This application claims the benefit of U.S. Provisional Application No. 62/110,339, filed Jan. 30, 2015, which is incorporated herein by reference in its entirety.

TECHNICAL FIELD

The subject matter disclosed herein generally relates to providing contextual connection recommendations in a social network.

BACKGROUND

Social networks conventionally include multiple users who join the social network as members. Those members may be connected to one another on the social network to facilitate the sharing of information between and among the various members of the social network. Members may search for other members and extend invitations via the social network to connect. In general, the greater the number of connections in a social network, the greater the amount of content that is shared and the more engaged with the social network the members may tend to be.

BRIEF DESCRIPTION OF THE DRAWINGS

Some embodiments are illustrated by way of example and not limitation in the figures of the accompanying drawings.

FIG. 4 is a table of contextual connection recommendation modifiers for members of a social network, in an example embodiment.

DETAILED DESCRIPTION

Example methods and systems are directed to contextual connection recommendations in a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Social networks may seek to increase the connectedness of members of the social network by providing recommendations to a first member of the social network that the first member may know and/or want to connect with certain other members of the social network. The social network may, for instance, analyze the first member's existing connections to infer connections that the first member might want to make. By way of example, if the first member has connections with eight other members who are all connected to a second member, the social network may propose to the first member that the first member may know or want to connect to the second member.

However, such mechanisms may lack the overall context of the likely relationship between the first and second members. Thus, a relatively large number of shared connections between the first and second members may be because they are coworkers and do, in fact, know one another or would be likely to get to know one another. Alternatively, the connections may be via former coworkers of the first member, and the second member may have joined the first member's former employer after the first member left. In such a case, even though there is relatively large number of shared connections, the first and second members do not know one another and may never have a reason to know one another. In such an example, a connection recommendation between the first and second members may be spurious and ignored.

A connection recommendation system for a social network has been developed that considers the context of the subject members of the recommendation. The system may consider factors such as employers, educational background, including schools, memberships, activities on the social network, and the like as well as shared connections and adjust connection recommendations accordingly. The system may consider such factors in real time and may update recommendations based on new connections or invitations for connections. Thus, if the first member sends out connection requests to members who are employees of a certain company, then recommendations to the first member for other employees of the company may be prioritized higher than other recommendations for members who are not employees of the company.

Figure 1:
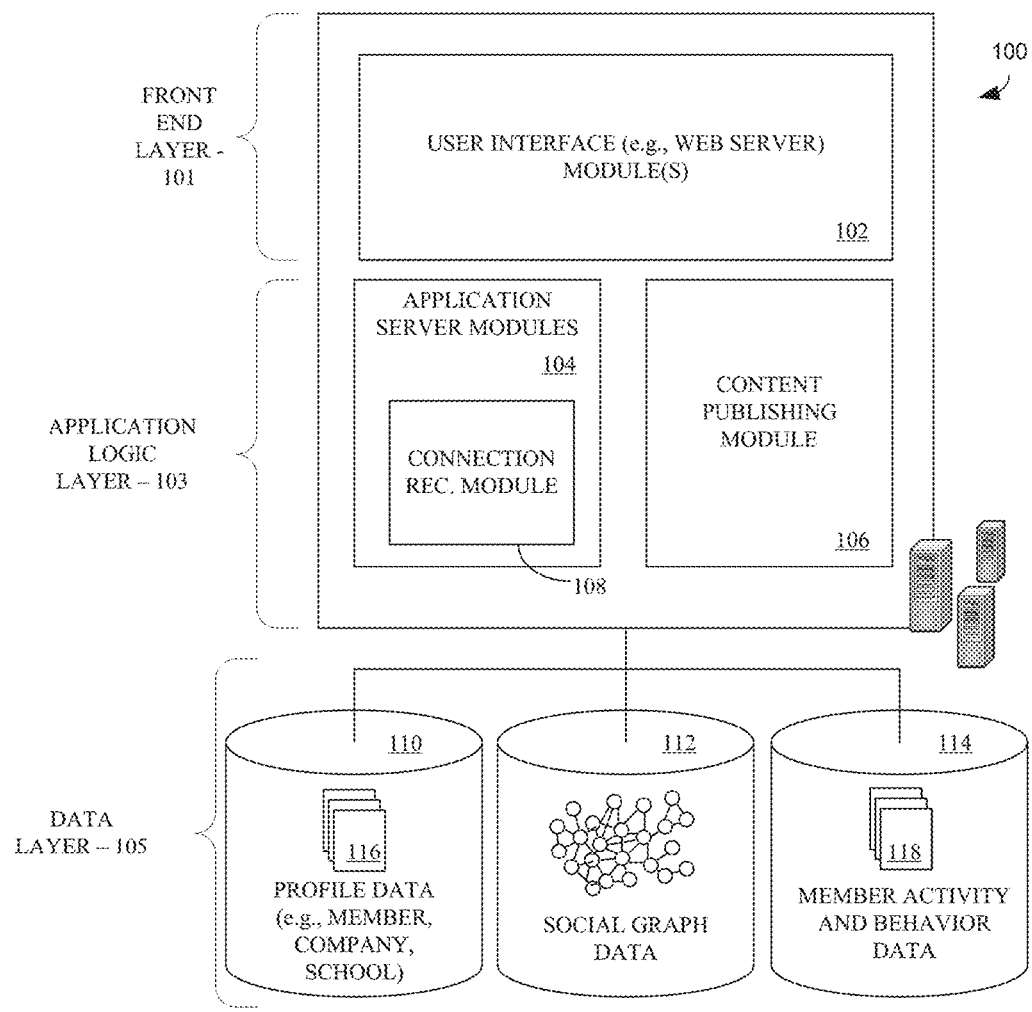
FIG. 1 is a block diagram illustrating various components or functional modules of a social network system, consistent with some examples.

FIG. 1 is a block diagram illustrating various components or functional modules of a social network system 100, consistent with some examples. A front end 101 consists of a user interface module (e.g., a web server) 102, which receives requests from various client-computing devices and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network system 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104. In some examples, the social network system 100 includes a content item publishing module 106, such as may be utilized to receive content, such as electronic messages, posts, links, images, videos, and the like, and publish the content to the social network.

One or more of the application server modules 104, content item publishing module 106, or the social network system 100 generally may include a connection recommendation module 108. As will be disclosed in detail herein, the connection recommendation module 108 may generate recommendations for connections between members of the social network. The connection recommendation module 108 may utilize member profiles and user activities it the generation of connection recommendations.

The connection recommendation module 108 may be implemented on a separate server or may be part of a server that provides other portions of the social network system 100. Thus, it is to be understood that while the connection recommendation module 108 is described as an integral component of a social network, the principles described herein may be applied without the connection recommendation module 108 being an integral part of a social network or even necessarily utilizing data from a social network if member profile information and user activities are available from alternative sources.

As illustrated, the data layer 105 includes, but is not necessarily limited to, several databases 110, 112, 114, such as a database 110 for storing profile data 116, including both member profile data as well as profile data for various organizations. Member profile data may include a list of connections each member has with other members of the social network. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles that the member has held with the same or different companies, and for how long, this information can be used to infer or derive a member profile attribute indicating the member's overall seniority level or seniority level within a particular company, With some examples, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

Activities by users of the social network system 100 may be logged as activities 118 in the activity and behavior database 114. Such activities 118 may include interactions with content displayed on the social network. Interactions may include clicking on a link to read an article, commenting on a post to the social network, "liking" or otherwise approving of a post, sharing the post, or any of a variety of mechanisms by which a member may engage with social network content.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

Although not shown, with some examples, the social network system 100 provides an API module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices e.g., phone, or tablet computing devices) having a mobile operating system.

Figure 2:
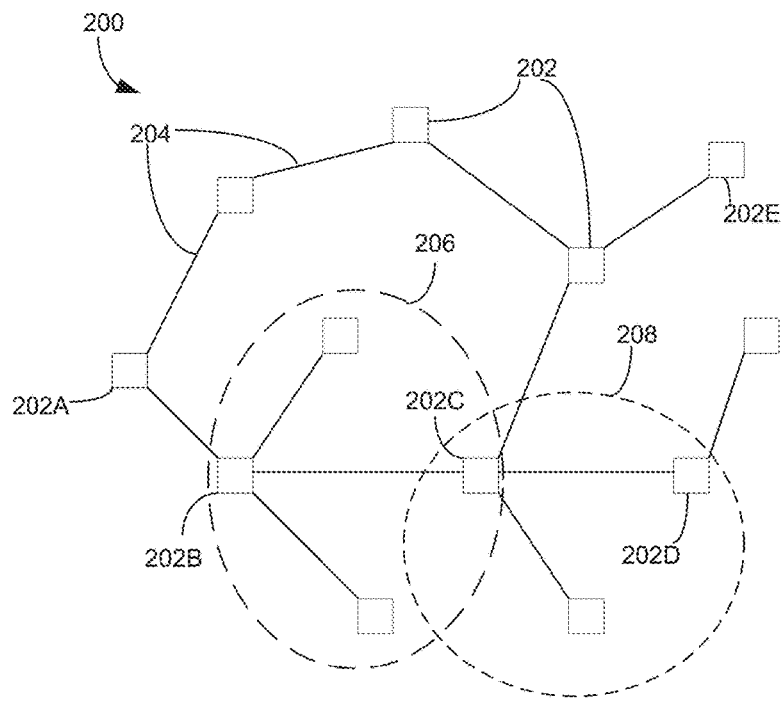
FIG. 2 is a simplified illustration of a social network, in an example embodiment.

FIG. 2 is a simplified illustration of a social network 200, in an example embodiment. The social network 200 may be provided by the social network system 100 or any suitable system.

The social network 200 includes members 202 linked to one another within the social network 200 via connections 204. Not all members 202 have connections 204 with all of the other members 202. Certain members 202 have further affiliations with other members 202. For instance, certain members 202 are employees of the same company 206, as noted in those members' 202 profile data 116. Other members 202 are related to one another for having attended the same school 208.

Members 202 of the social network 200 have defined connection relationships between one another. Members 202A, 202B who have a direct connection 204 have a first-degree connection. Members 202A, 202C who do not have a direct connection 204 with one another but who each have a direct connection 204 to another member 202B have a second-degree connection. Members 202A, 202D who do not have a second-degree connection but who are connected via two other members 202B, 202C have a third-degree connection, and so forth.

The illustration of the social network 200 is simplified for the purposes of explanation. It is to be understood that the social network 200 may incorporate millions or billions of members 202. Each of those members 202 may have dozens or hundreds or more of affiliations that may be formally chosen by each member 202, such as groups that the member 202 may elect to join, or may be inferred by the social network 200 from the member's 202 profile data 116.

Figure 3:
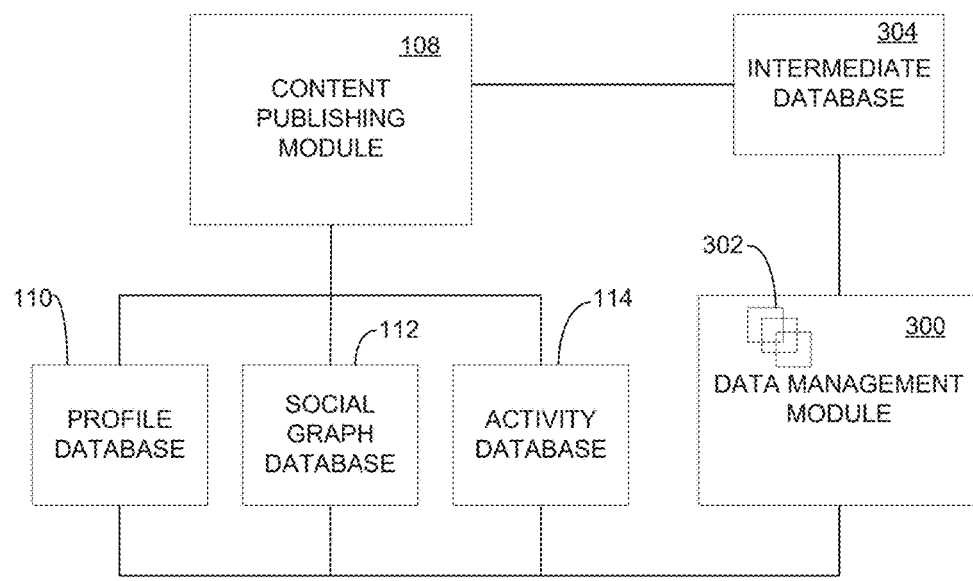
FIG. 3 is a depiction of aspects of a social network system, in an example embodiment.

FIG. 3 is a depiction of aspects of the social network system 100, in an example embodiment. The depiction of the social network system 100 in FIG. 3 is presented to facilitate the description of aspects of the social network system 100 particularly related to providing contextual connection recommendations within the social network 200 and is not a limiting embodiment or example.

The connection recommendation module 108 is coupled to the profile database 110, the social graph database 112, and the activity database 114. The profile and activity databases 110, 114 are coupled to a data management module 300. The data management module 300 may incorporate data storage and data processing elements that may utilize the profile data 116 and activities data 118 stored on the databases 110, 114 to identify contextual information that may influence or modify connection recommendations provided by the connection recommendation module 108.

In an example, the data management module 300 is an integral part of the connection recommendation module 108. Alternatively, the data management module 300 is operated separately from the connection recommendation module 108, as illustrated. In such an example, the connection recommendation module 108 provides modifiers that are incorporated by the connection recommendation module 108 and utilized to update basic connection recommendations. As such, the separate data management module 300 may allow for a conventional connection recommendation module 108 to be utilized without fundamentally updating the conventional recommendation module 108.

The data management module 300 collects profile data 116 and activities data 118 on an ongoing basis and utilizes data processing to identify relationships between data 116, 118 of different members 202. The data processing may focus on new data, e.g., data recently added to the databases 110, 114, and determining relationships between and among the new data and old data. The data management module 300 may do so effectively in real time where the databases 110, 114 push the new data out the data management module 300 upon receipt of the data. Alternatively, the data management module 300 may poll the databases 110, 114 for new data periodically. Very frequent polling, such as with a frequency on the order or seconds or minutes, of may create the practical effect of real time updating or may be more distinctly periodic, such as with a frequency on the order of tens of minutes or hours.

As noted above, the data management module 300 may, in various examples, utilize or favor only relatively recent data 116, 118. For instance, in an example, the data management module 300 may utilize activity data 118 that is less than one month old, It is to be recognized that additional or alternative time cutoffs may be utilized. Alternatively, the data management module 300 may implement a weighting function that favors recently added data 116, 118 over relatively older data. For instance, relationships that are identified on the basis of data 116, 118 added within two weeks may be weighted at one hundred percent; data 116, 118 added from two weeks to four weeks may be weighted at seventy-five percent; data added from four weeks to six weeks may be weighted at fifty percent; and so forth.

The data management module 300 may utilize a distributed storage and distributed processing technique to analyze the data 116, 118 received. In an example, the data management module 300 utilizes an Apache Hadoop framework for both storage and processing. In such an example, the data management module 300 includes multiple processing and storage clusters. In various examples, the databases 110, 114 may function or be utilized as the distributed storage, and the data management module 300 may perform only the distributed processing function. In such an example, the data management module 300 may utilize the Map/Reduce distributed processing function of the Hadoop framework without necessarily implementing the distributed file system.

The data management module 300 determines contextual connection recommendation modifiers 302 between individual members 202 of the social network 200. In an example, a pair of members 202 has a single modifier 302 defined by common data 116, 118 between those members 202. The modifier 302 for a pair of members 202 may be uniquely determined for that pair of members 202.

In an example, each member 202 may b paired with each other member 202 and, for each pair, the data management module 300 may determine a unique modifier 302. In that way, each member 202 of the social network 200 may be assigned a unique contextual modifier 302 for each and every other member 202 of the social network. It is to be recognized, however, that doing so may be very computationally intensive if the social network 200 includes a large number of members. If the data management module 300 includes sufficient computational resources, then a unique modifier 302 may be determined for each unique pair of members 202. However, if doing an is impractical, then the data management module 300 may establish or be provided with criteria for which pairs of members 202 have determined modifiers 302. In an example, only pairs of members 202 who have second- and third-degree connections are assigned a modifier 302. If computational resources permit, higher order connections, such as fourth- and fifth-degree connections, may receive modifiers 302. In various examples, pairs of members who already have first-degree connections, i.e., members 202 who already have a direct connection 204, do not receive a modifier 302 unless and until the connection 204 is terminated.

These conditions for determining a modifier 302 between a given pair of members 202 are for example and may be adjusted for circumstances including, but not limited to, the number of members 202 of the social network 200 and the available computing resources. If computing resources remain available after determining modifiers 302 for each of the pairs of members 202, then more modifiers 302 may be determined for more pairs of member 202. Alternatively, if the computing resources are not sufficient to keep up with the computing needs of a target number or distribution of modifiers between pairs of members 202, then conditions under which a pair of members 202 has a modifier determined may be tightened and fewer modifiers 302 may be determined, as appropriate.

FIG. 4 is a table 400 of contextual connection recommendation modifiers 302 for members 202 of the social network 200, in an example embodiment. The table 400 is presented for the purposes of visualizing the modifiers 302 and the relationship between the members 202 of the social network 200. It is to be understood that the table 400 is not necessarily created or maintained by the social network system 100.

The table 400 includes cells 402 that show the modifier 302 for each pair of members 202 included in the table. The table 400 is simplified for the purposes of illustration and does not include a cell 402 for each potential pair of members 202 illustrated in the social network 200 of FIG. 2. The principles illustrated in the table 400 are readily applicable across a larger population of members 202.

For each pair of members 202 included in the table 400, the data management module 300 determines the modifier 302 by comparing or variously considering relevant profile data 116 and activities 118 of the two members 202 of the pair. Matches between profile data 116 and activities 118 of the members 202 may increase the modifier 302. in an example, the modifier 302 between pairs of members 202 starts at zero and is increased based on data matches. Thus, if a pair of members both work at the same company 206, then the modifier is increased by 0.5. If a pair of members 202 used to work at the same company 206, then the modifier is increased by 0.25. For each social group the members 202 both belong to the modifier 302 may be increased by 0.5. For each posting or content on the social network with which the members 202 have both interacted, the modifier 302 may be increased by 0.1.

These examples are simplified and any data points that can be identified as common between two members 202 may be selected and utilized. Further, it is to be recognized that, for various social networks, both the types of data and activities that produce changes to the modifier 302 may vary. Thus, a social network that focuses on professional connections may utilize and weight professional factors, such as jobs and schools, higher than shared memberships in social groups. A social network that focuses on social interactions, on the other hand, may utilize and weight social groups and common interests more heavily careers and educational background.

In an example, the common factors between the pair of members 202 are added together to arrive at the modifier. Thus, by way of simplified illustration, a pair of members 202 who work at the same company 206 (0.5), who attended the same school 208 (0.5), who belong to three groups together (0.5*3=1.5) and who have interacted with fifteen (15) of the same articles (0.1*15=1.5) over a predetermined time period (e.g., one month) would have a modifier of 4.0. Two members 202 whose only point of similarity is that they used to work at the same company 206 would have a modifier of 0.25.

The connections 204 of members 202 may also be factored in to determining the modifier 302. If the member 202A connects with the member 202C, all of the members 202 with whom the member 202C is connected may have their modifier 302 increased by a factor (1.0, for example) between those members 202 and the member 202A. In other words, the second-degree connections with the member 202A by way of the new connection 204 with the member 202C may receive a bonus in the modifier 302. The bonus to the modifier 302 may be removed or may decay over time; thus, relatively more-recent connections 204 may produce the bonus while older connections 204 may not. In an example, the bonus for a new connection 204 lasts two (2) weeks and then is discontinued or progressively reduced.

In an example, the data management module 300 updates the modifier 302 for a pair of members 202 based on one of the members 202 of the pair making a new connection 204 or inviting another member 202 to connect on the social network 200. Thus, in an example, if member 202A make a connection with member 202C, then some or all of the members 202 of the social network 200 who work at the same company 206, went to the same school 208, belong to the same groups, and so forth as member 202C may have their modifiers with the member 202A updated. In other words, the member 202A connecting with the member 202C may be a trigger for updating the modifier 302 of the member 202D, who went to the same school 208 as the member 202C, but not the member 202E, who neither works in the same company 206 as the member 202C nor otherwise has any affiliation with the member 202C.

Returning now to FIG. 3, the data management module 300 provides the modifiers 302 as computed to the connection recommendation module 108. In various examples, the data management module 300 transmits the modifiers 302 on the basis of a periodic upload, e.g., daily, or more or less frequently, as desired. Alternatively, the data management module 300 may transmit a modifier 302 upon the calculation of the modifier, e.g., in real time.

In the illustrated example, the data management module 300 pushes the modifiers 302 to an intermediate database 304. In such an example, the connection recommendation module 108 accesses the database 304 for a modifier 302 between a pair of members 202 when the connection recommendation module 108 is determining whether or not to make a connection recommendation to one of the members 202. Alternatively, the database 304 may be an integral part of the connection recommendation module 108, and the data management module 300 may simply push the modifiers 302 to the connection recommendation module 108 directly. Further alternatively, the data management module 300 may store the modifiers 302 until the connection recommendation module 108 requests a modifier, in such an example, the database 304 may be an integral component of the data management module 300.

The connection recommendation module 108 utilizes the modifier 302 by adjusting an internally-generated connection recommendation score, regardless of how the internally-generated score may have been arrived at. For instance, in a basic case, the connection recommendation module 108 may generate a base connection recommendation score simply by randomly selecting two members 202 who are not yet connected and making a recommendation; in that case, all pairs of members 202 may have a base score of 1.0. On a more involved level, the connection recommendation module 108 may score a pair of members 202 who have a second-degree connection a 3.0, a pair of members 202 who have a third-degree connection a 2.0, and a pair of members 202 who have a fourth-degree connection a 1.0, and not make additional pairs of members 202 eligible for a connection recommendation. In an example, the scores for connections are cumulative, adding the score for each second-degree connection, each third-degree connection, and so forth between two members 202. Alternatively, the score for degree of connection is simply that of the closest connection; thus, if two members have multiple second- and third-degree connections then the score is equal to one second-degree connection. These examples are for the purposes of illustration and it is to be recognized that any of a variety of mechanisms for generating a base connection recommendation score may be utilized.

The connection recommendation module 108 then applies the modifier 302 to the base connection recommendation score for the pair of members 202 to determine a connection recommendation modified score. In an example, the connection recommendation module 108 multiples the base connection recommendation score with the modifier 302. Alternatively, the connection recommendation module 108 adds the modifier to the base score. Additional mathematical operations for applying the modifier to the base score are contemplated.

The details of application of the modifier to the base score may depend on the policies of the social network 200. For instance, if the social network 200 policy seeks to increase connections 204 with the overall quality of the connections 204 being a secondary consideration, then the connection recommendation module 108 may add the modifier 302 to the base score. Additionally or alternatively, the connection recommendation module 108 may add 1.0 to the modifier 302 or otherwise ensure that all modifiers 302 are above zero and then multiply the modifier 302 with the base score, thereby preventing final connection recommendation scores from being less than the base score or from being zero in the event that the modifier 302 is also zero, Alternatively, if the social network 200 policy seeks relatively high-quality connections 204 at the potential cost of fewer near-term connections then the modifier 302 may be multiplied by the base score without additional adjustment. In that case, members 202 who have little or nothing in common would be unlikely to receive a connection recommendation even if those members 202 have a relatively close social graph.

The connection recommendation module 108 may provide recommendations to one member 202. for connections 204 with the highest ranked other members 204 based on the base score as modified for that pair of members 202. The connection recommendation module 108 may provide a predetermined number of recommendation based on the highest modified scores. Alternatively, the connection recommendation module 108 may provide recommendations based on all of the modified scores that exceed a predetermined threshold.

An illustrative example is provided herein. The illustrative example utilizes certain mechanisms and variations thereon to illustrate the determination of several modified scores for making connection recommendations. It is to be recognized and understood that the illustrative example is not limiting and that any suitable mechanisms may be utilized as appropriate to the circumstances.

In the illustrative example, a first member 202 has five second-degree connections and three third-degree connections with a second member 202, for a total base score of 5*4+3*3=29. The first member 202 and the second member 202 have a modifier 302 of 0.25 (the calculation of the modifier is omitted for the sake of simplicity hut the principles are illustrated herein), producing a modified score of 29*0.1=2.9. In the illustrative example, the first member 202 has two second-degree connections and two third-degree connections with a third member 202, for a total base score of 2*4+2*3=14. The first and third members 202 have a modifier 302 of 2.25, producing a modified score of 14*2.25=31.5. In the illustrative example, the first member 202 has one second-degree connection and five third-degree connections with a fourth member 202 for a total base score of 19. The first and fourth members 202 have a modifier 302 of 1.5, for a modified score of 19*1.5=28.5. In the illustrative example, the first member 202 has eight second-degree connections and ten third-degree connections with a fifth member 202 for a total base score of 62. The first and fifth members 202 have a modifier 302 of 0.8, for a modified score of 62*0.8=49.6.

In the illustrative example, the connection recommendation module 108 is configured to provide two connection recommendations. As such, the connection recommendation module 108 provides connection recommendations for the third and fifth members 202 to the message publishing module 106. The message publishing module 106 generates a message for display on a user interface of the first member 202. The user interface module 102 causes the message to be transmitted to a user interface of the first member 202.

In an example, the connection recommendation includes a link that the first member 202 may click or otherwise select to variously cause or request a connection 204 between the first member 202 and the object member 202 of the connection recommendation (in the illustrative example, either the third or the fifth member 202). If the link is for a connection request, the object member 202 of the request may either accept or reject the connection request. In various examples, upon the first member either selecting the link or rejecting the connection recommendation, the connection recommendation module 108 may provide a replacement connection recommendation by providing a recommendation corresponding to the next-highest modified score. Thus, if the first user 202 requests a connection with the third member 202, the connection recommendation module 108 may then follow up with a connection recommendation with the fourth member 202.

Flowchart

Figure 5:
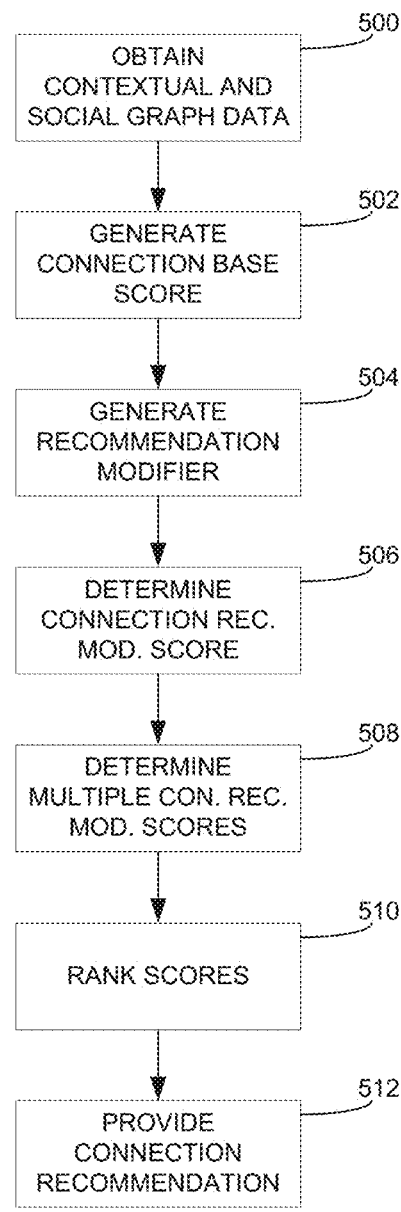
FIG. 5 is a flowchart for contextual connection recommendation in a social network, in an example embodiment.

FIG. 5 is a flowchart for contextual connection recommendation in a social network, in an example embodiment. The flowchart may be performed with any of a variety of devices and systems disclosed herein, as well as with any suitable system known in the art.

At operation 500, contextual data and social graph data related to a pair of members of a social network who are not currently connected on the social network are obtained, with a processor, from a database. In an example, the contextual data is profile data of each of the pair of members and activity data of each of the pair of members. In an example, the profile data includes individual data points for each of the pair of members. In an example, each pair of the individual data points is assigned a score based on the similarity of the data points of the pair. In an example, the activity data includes activities on the social network by the pair of members.

At operation 502, a connection base score between the pair of members is generated by the processor based on the social graph data. In an example, the base score is generated based on common connections within the social network between the members of the pair of members and other members of the social network. In an example, the common connections include connections of multiple degrees.

At operation 504, a recommendation modifier is generated, by the processor, based on the contextual data. In an example, generating the recommendation modifier is based, at least in part, on a similarity between pairs of the individual data points. In an example, generating the recommendation modifier is based, at least in part, on a combination of the score of each pair of the individual data points. In an example, generating the recommendation modifier is based, at last in part, on related activities by the pair of members. In an example, the related activities are based, at least in part, on an interaction by one of the pair of members with an action by another one of the pair of members.

At operation 506, a connection recommendation modified score is determined, by the processor, by applying the recommendation modifier to the base score.

At operation 508, a plurality of connection recommendation modified scores are determined by the processor, individual ones of the plurality of connection recommendation modified scores corresponding to one of a plurality of pairs of members, each of the plurality of pairs of members including the first member, each one of the plurality of connection recommendation modified scores determined based on a connection base score between members of an associated one of the plurality of pairs of members and a recommendation modifier between the members of the associated one of the plurality of pairs of members.

At operation 510, the plurality of connection recommendation modified scores are ranked by the processor.

At operation 512, a connection recommendation is provided, by the processor, to at least one of the pair of members based, at least in part, on the connection recommendation modified score. In an example, providing the connection recommendation includes providing connection recommendations ranked based on the plurality of connection recommendation modified scores.

System

Figure 6:
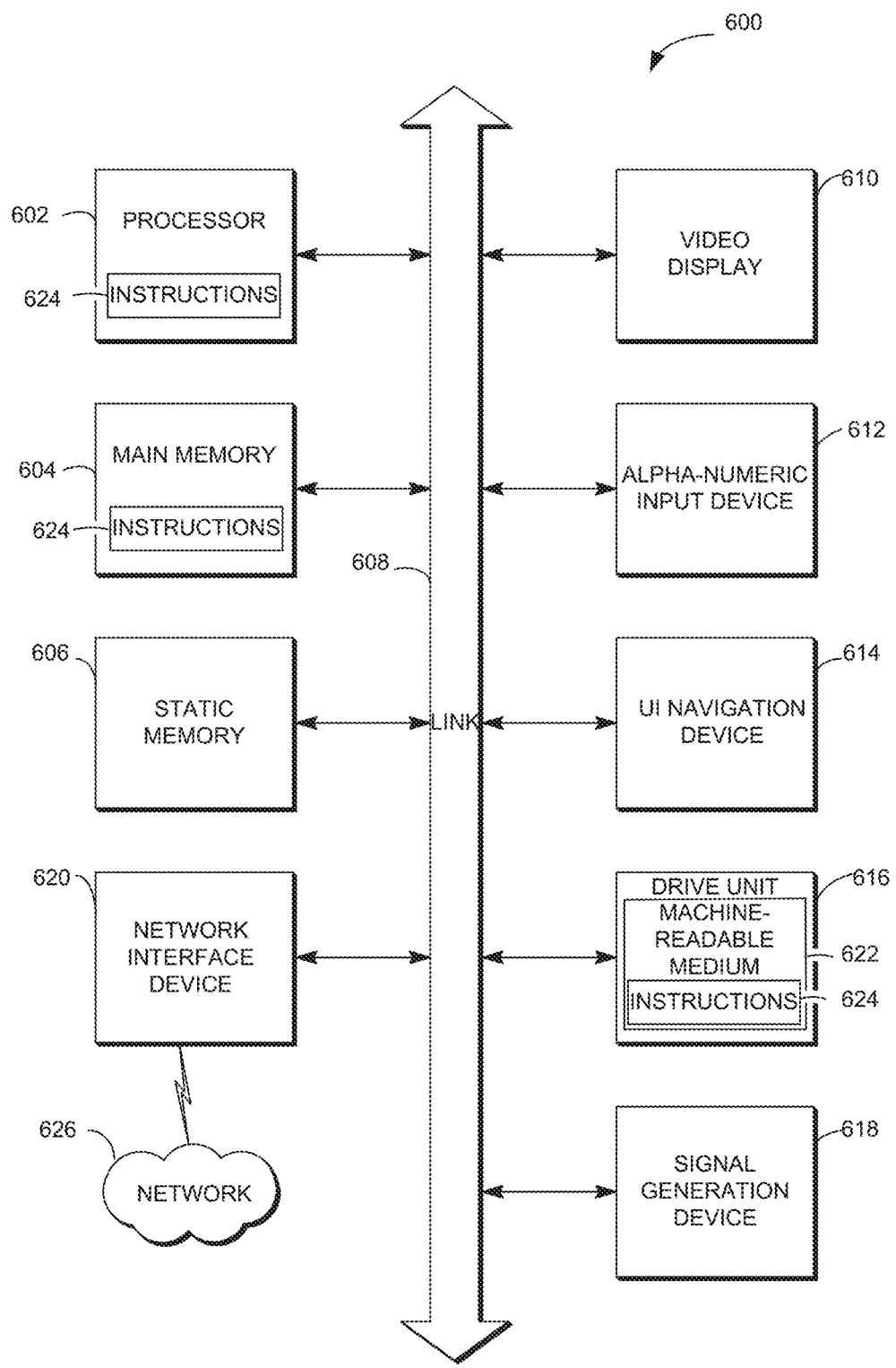
FIG. 6 is a block diagram illustrating components of a machine, according to some example embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, the machine 600 may implement the social network system 100 and the features included and described therein. The machine 600 thus describes specific hardware configurations on which the social network system 100 may be implemented and provided to users of the social network system 100.

FIG. 6 shows a diagrammatic representation of the machine 600 in the example form of a computer system and within which instructions 624 (e.g., software) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), alight emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
   obtaining, with a processor from a database, contextual data and social graph data related to a pair of members of a social network who are not currently connected on the social network;

generating, with the processor, a connection base score between the pair of members based on the social graph data;

generating, with the processor, a recommendation modifier based on the contextual data;

determining, with the processor, a plurality of connection recommendation modified scores, individual ones of the plurality of connection recommendation modified scores corresponding to one of a plurality of pairs of members, each of the plurality of pairs of members including the first member, each one of the plurality of connection recommendation modified scores determined based on a connection base score between members of an associated one of the plurality of pairs of members and a recommendation modifier between the members of the associated one of the plurality of pairs of members;

ranking, with the processor, the plurality of connection recommendation modified scores; and providing, via a network interface, connection recommendations ranked based on the plurality of connection recommendation modified scores;

wherein the contextual data is profile data of each of the pair of members and activity data of each of the pair of members;

wherein the profile data includes individual data points for each of the pair of members; and wherein generating the recommendation modifier is based, at least in part, on a similarity between pairs of the individual data points.

2. The method of claim 1, wherein each pair of the individual data points is assigned a score based on the similarity of the data points of the pair; and wherein generating the recommendation modifier is based, at least in part, on a combination of the score of each pair of the individual data points.

3. The method of claim 1, wherein the activity data includes activities on the social network by the pair of members; and wherein generating the recommendation modifier is based, at last in part, on related activities by the pair of members.

4. The method of claim 3, wherein the related activities are based, at least in part, on an interaction by one of the pair of members with an action by another one of the pair of members.

5. The method of claim 1, wherein generating the connection base score is based on common connections within the social network between the members of the pair of members and other members of the social network.

6. A non-transitory computer readable medium, comprising instructions which, when implemented by a processor, cause the processor to perform operations comprising:

obtaining, with a processor from a database, contextual data and social graph data related to a pair of members of a social network who are not currently connected on the social network;

generating, with the processor, a connection base score between the pair of members based on the social graph data;

generating, with the processor, a recommendation modifier based on the contextual data;

determining, with the processor, a plurality of connection recommendation modified scores, individual ones of the plurality of connection recommendation modified scores corresponding to one of a plurality of pairs of members, each of the plurality of pairs of members including the first member, each one of the plurality of connection recommendation modified scores determined based on a connection base score between members of an associated one of the plurality of pairs of members and a recommendation modifier between the members of the associated one of the plurality of pairs of members;

ranking, with the processor, the plurality of connection recommendation modified scores; and providing, via a network interface, connection recommendations ranked based on the plurality of connection recommendation modified scores;

wherein the contextual data is profile data of each of the pair of members and activity data of each of the pair of members;

wherein the profile data includes individual data points for each of the pair of members; and wherein generating the recommendation modifier is based, at least in part, on a similarity between pairs of the individual data points.

7. The non-transitory computer readable medium of claim 6, wherein each pair of the individual data points is assigned a score based on the similarity of the data points of the pair; and wherein generating the recommendation modifier is based, at least in part, on a combination of the score of each pair of the individual data points.

8. The non-transitory computer readable medium of claim 6, wherein the activity data includes activities on the social network by the pair of members; and wherein generating the recommendation modifier is based, at last in part, on related activities by the pair of members.

9. The non-transitory computer readable medium of claim 8, wherein the related activities are based, at least in part, on an interaction by one of the pair of members with an action by another one of the pair of members.

10. The non-transitory computer readable medium of claim 6, wherein generating the base score is based on common connections within the social network between the members of the pair of members and other members of the social network.

11. A system, comprising:

a computer readable medium, comprising instructions which, when implemented by a processor, cause the processor to perform operations comprising:

obtaining, from a database, contextual data and social graph data related to a pair of members of a social network who are not currently connected on the social network;

generating a connection base score between the pair of members based on the social graph data;

generating a recommendation modifier based on the contextual data;

determining a plurality of connection recommendation modified scores, individual ones of the plurality of connection recommendation modified scores corresponding to one of a plurality of pairs of members, each of the plurality of pairs of members including the first member, each one of the plurality of connection recommendation modified scores determined based on a connection base score between members of an associated one of the plurality of pairs of members and a recommendation modifier between the members of the associated one of the plurality of pairs of members;

ranking the plurality of connection recommendation modified scores; and providing, via a network interface, connection recommendations ranked based on the plurality of connection recommendation modified scores;

wherein the contextual data is profile data of each of the pair of members and activity data of each of the pair of members;

wherein the profile data includes individual data points for each of the pair of members; and wherein generating the recommendation modifier is based, at least in part, on a similarity between pairs of the individual data points.

12. The system of claim 11, wherein each pair of the individual data points is assigned a score based on the similarity of the data points of the pair; and wherein generating the recommendation modifier is based, at least in part, on a combination of the score of each pair of the individual data points.

13. The system of claim 11, wherein the activity data includes activities on the social network by the pair of members; and wherein generating the recommendation modifier is based, at last in part, on related activities by the pair of members.

14. The system of claim 13, wherein the related activities are based, at least in part, on an interaction by one of the pair of members with an action by another one of the pair of members.

15. The system of claim 11, wherein generating the base score is based on common connections within the social network between the members of the pair of members and other members of the social network.

16. The system of claim 11, further comprising the processor operatively coupled to the compute readable medium.

17. The system of claim 16, further comprising the network interface operatively coupled to the processor.

18. The system of claim 11, further comprising the database operatively coupled to the processor.

* * * * *